Dec. 19, 1922.

M. ERMAN ET AL.
ARTIFICIAL FLOWER.
FILED MAY 27, 1921.

1,439,539.

Inventors
Mariya Erman
Justena Lamovsek
By Morsell & Keeney
Attorneys

Patented Dec. 19, 1922.

1,439,539

UNITED STATES PATENT OFFICE.

MARIYA ERMAN AND JUSTINA LAMOVŠEK, OF MILWAUKEE, WISCONSIN.

ARTIFICIAL FLOWER.

Application filed May 27, 1921. Serial No. 472,994.

*To all whom it may concern:*

Be it known that we, MARIYA ERMAN and JUSTINA LAMOVŠEK, citizens of the United States and Jugo-Slavia, respectively, and residents of Milwaukee, in the county of Milwaukee and State of Wisconsin, have invented new and useful Improvements in Artificial Flowers, of which the following is a description, reference being had to the accompanying drawings, which are a part of this specification.

This invention relates to improvements in artificial leaves or petals and method of making the same.

One of the objects of the invention is to provide a leaf or petal of such construction that it will bear a more striking resemblance to the natural leaf or petal which is simulated, than has been possible to obtain heretofore.

A further object of the invention is to provide a leaf or petal of simple and durable construction and which may be economically manufactured.

A further object of the invention is to provide a novel method of constructing the leaf or petal.

The invention consists in the novel constructions and arrangements to be hereinafter described and claimed for carrying out the above stated objects and such other objects as will appear from the following description of a certain preferred embodiment illustrated in the accompanying drawings, wherein—

Like characters of reference designate like parts in the several views.

The frame which forms the outline of the leaf or petal to be made comprises a piece of easily bendable wire 6 which is formed in any desired manner so as to provide a plurality of convolutions, corrugations or depressions 7, the wire being shaped so as to provide a frame the outline of which conforms substantially to the outline of the leaf or petal to be formed. The extremities 8 of the wire are preferably left plain, that is to say, not provided with convolutions and are twisted together to form the stem 9 of the leaf or petal.

Figure 3:
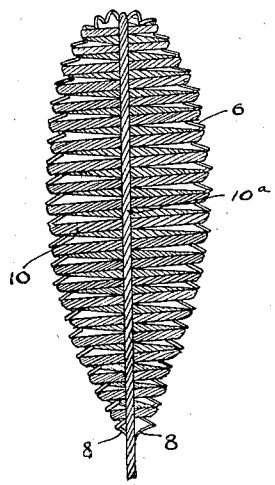
Fig. 3 is an elevational view of the leaf shown in Fig. 2 after being unfolded.

The space enclosed within the frame thus formed may be covered in any desired manner, but is preferably covered by winding a cord 10 transversely, first, around that portion of the wire which forms one side of the leaf or petal and then around that portion of the wire which forms the opposite side of the leaf or petal, and so on back and forth from one end of the leaf to the other until the space within the frame is entirely covered substantially as shown in the drawings, particularly in Fig. 3, the two ends of the cord being secured to the frame to prevent unwinding thereof. In order to form the central vein of the leaf or petal, a portion $10^a$ of the cord 10 is stretched from one end of the frame to the other across the transverse portions 10 of the cord, substantially as shown in Fig. 3. The preferred way of filling in the space enclosed by the leaf or petal is to attach one end of the cord to the lower part of the leaf or petal and then wind the cord transversely around the frame from bottom to top and then bring the free end of the cord down from the top of the leaf or petal across the transverse windings and securing that end to the bottom of the leaf or petal.

Figure 1:
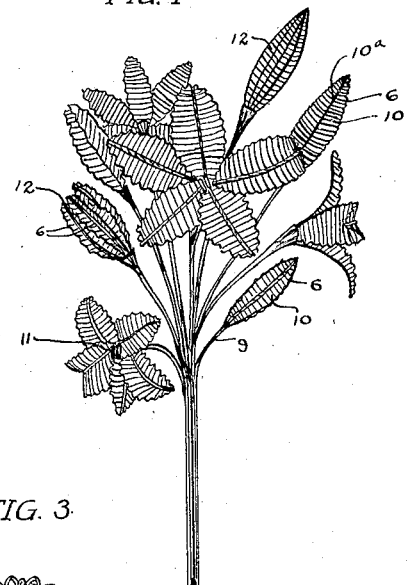
Fig. 1 is a side elevational view of a spray of flowers and leaves constructed according to the principles of the invention.
Figure 2:
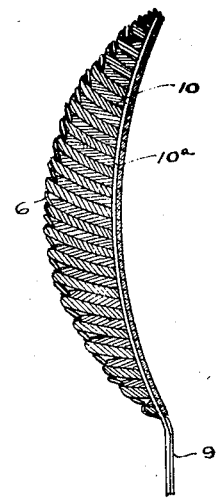
Fig. 2 is a side elevational view, on an enlarged scale, of a folded leaf embodying the principles of the invention.
Figure 4:
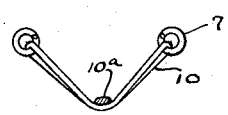
Fig. 4 is a transverse sectional view of a leaf partially unfolded.

A leaf or petal formed according to the principles of this invention may be easily bent to the desired shape, for example, one half of a leaf may be folded over against the other half substantially as shown in Fig. 2 so as to give every appearance of a leaf not yet unfolded. The numerous convolutions in the wire forming the frame give the appearance of a ragged edge which is characteristic of a large number of leaves. By making the convolutions rather large the ragged edged appearance is more pronounced than is the case when the convolutions are made rather small. The wire 6 may be covered with a fine cord of any desired color and the cord 10 may be of any desired color, preferably having a lustrous or silky finish. The cord is preferably somewhat loosely twisted and not being drawn very tight across the frame, the result is that the space enclosed by the frame is substantially completely covered and when the proper colors are used, the leaf or petal has a very striking resemblance to a natural leaf or petal. By twisting the stems of several leaves or petals together a spray or cluster may be readily formed. When several of the petals are thus grouped together the appearance of natural flowers may be closely simulated by intertwining short cords 11 of the proper color to represent the stamens. By taking two frames and positioning one of them substantially at right angles to the other and then winding the cord transversely around the frames the appearance of a natural unfolded bud may be closely simulated, as shown at 12 in Fig. 1.

We claim:

1. An artificial leaf or petal comprising a length of a wire, the central portion of which is provided with a plurality of relatively closely spaced convolutions, and bent back upon itself in spaced relation to form a frame, the end portions of said wire being straight and twisted together to form a stem; and cords extending transversely of said frame, seated in adjacent convolutions thereof, to substantially completely fill the space within said frame.

2. An artificial leaf or petal comprising a wire formed with a plurality of relatively closely spaced depressions and shaped so as to provide a frame, the outline of which conforms substantially to the outline of the leaf or petal to be formed, and cords extending transversely from each depression in the wire on one side of said frame to a corresponding depression in the wire on the opposite side of said frame to fill in the space within said frame.

3. An artificial leaf or petal comprising a wire formed with a plurality of relatively closely spaced depressions and shaped so as to provide a frame, the outline of which conforms substantially to the outline of the leaf or petal to be formed, and a cord secured at one end to said frame and wound transversely therearound in adjacent depressions from one end to the other to fill in the space within said frame, the free ends of the cord being secured to the frame.

4. An artificial leaf or petal comprising a coiled wire, the convolutions of which are relatively closely spaced, said wire being shaped so as to provide a frame, the outline of which conforms substantially to the outline of the leaf or petal to be formed, cords extending transversely of said frame seated in adjacent convolutions to fill in the space within said frame, and a cord extending from end to end of the leaf or petal thus formed across said transverse cords for the purpose described.

In testimony whereof, we affix our signatures.

MARIYA ERMAN.
JUSTINA LAMOVŠEK.